United States Patent
Chung (10) Patent No.: US 7,418,555 B2
(45) Date of Patent: Aug. 26, 2008

(54) MULTIPROCESSOR SYSTEM AND METHOD TO MAINTAIN CACHE COHERENCE

(75) Inventor: Sung-Woo Chung, Seoul (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 398 days.

(21) Appl. No.: 10/873,146

(22) Filed: Jun. 23, 2004

(65) Prior Publication Data

US 2005/0021914 A1    Jan. 27, 2005

(30) Foreign Application Priority Data

Jul. 22, 2003    (KR) .................. 10-2003-0050128

(51) Int. Cl.
*G06F 12/00* (2006.01)
(52) U.S. Cl. .................. 711/141; 711/120; 711/133; 711/145; 710/260
(58) Field of Classification Search .................. 711/141
See application file for complete search history.

(56) References Cited

U.S. PATENT DOCUMENTS

| 5,781,774 A | 7/1998 | Krick |
| 5,787,473 A * | 7/1998 | Vishlitzky et al. ........... 711/134 |
| 5,822,765 A | 10/1998 | Boatright et al. |
| 6,014,756 A * | 1/2000 | Dottling et al. ................ 714/15 |
| 6,032,231 A * | 2/2000 | Gujral ......................... 711/145 |
| 6,263,407 B1 | 7/2001 | Arimilli et al. |
| 6,493,809 B1 * | 12/2002 | Safranek et al. ............. 711/167 |
| 6,826,653 B2 * | 11/2004 | Duncan et al. .............. 711/141 |
| 7,065,614 B1 * | 6/2006 | Vartti et al. .................. 711/141 |

FOREIGN PATENT DOCUMENTS

| JP | 11-328025 | 11/1999 |
| KR | 10-0330934 | 3/2002 |

* cited by examiner

*Primary Examiner*—Donald Sparks
*Assistant Examiner*—Hashem Farrokh
(74) *Attorney, Agent, or Firm*—Harness, Dickey & Pierce, PLC (57) ABSTRACT

A multiprocessor system may have a plurality of processors and a memory unit. Each of the processors may include at least one cache memory. The memory unit may be shared by two of the processors. The multiprocessor system may further include a control unit. If the multiprocessor system receives an access request for a data block of the memory unit from one processor. The processors may also include a processing unit. When the processor shares a data block, the processing unit may invalidate the shared data block in the cache memory, write the shared data block from the write buffer to a memory unit, and forward an interrupt completion response to a control unit.

16 Claims, 8 Drawing Sheets

Fig. 2

|    | CA | CB |     | CC |
|----|----|----|-----|----|
| L0 |    |    |     |    |
| L1 |    |    | ... |    |
| L2 |    |    |     |    |
|    |    |    | .   |    |
|    |    |    | .   |    |
|    |    |    | .   |    |
| Ln |    |    | ... |    |

|    | CD | CE |  ...  | CF | V |
|----|----|----|-------|----|----|
| L0 |    |    |       |    |    |
| L1 |    |    |  ...  |    |    |
| L2 |    |    |       |    |    |
| ⋮  |    |    |   ⋮   |    |    |
| Lm |    |    |  ...  |    |    |

MULTIPROCESSOR SYSTEM AND METHOD TO MAINTAIN CACHE COHERENCE

This U.S. non-provisional patent application claims priority under 35 U.S.C. § 119 of Korean Patent Application 2003-50128 filed on Jul. 22, 2003, the disclosure of which is incorporated herein in its entirety by reference.

BACKGROUND OF THE INVENTION

1. Field of the Invention

The present invention relates in general to multiprocessor systems including a plurality of processors having respective cache memories and a memory unit shared by at least two of the processors, and more particularly to a multiprocessor system that maintains cache coherence in response to memory access requests from the processors.

2. Discussion of the Related Art

Conventional multiprocessor systems include a plurality of processors that may share (or access) the same memories. There are two basic memory sharing techniques. In the first technique, the processors may have access to the same address areas of the same memory. And in the second technique, the processors may have access to different address areas of the same memory. It will be appreciated that when the processors have access to the same address areas of the same memory (i.e., the first technique), then data read by one processor can also be read by another processor. Here, the memory is typically referred to as a shared-memory.

Software may be implemented using several program modules. When software programs are executed, the program modules may exchange information via the shared-memory. As a result, if the program modules are carried out in parallel on different processors, it may become difficult to perform the appropriate and timely shared-memory functions (e.g. updating the shared-memory).

To reduce the average time required by the processors to access the shared-memories, one or more cache memories may be arranged between the processors and the shared-memories. In some multiprocessor systems, each of the processors may include its own local cache memory that may be separate from the shared-memories. In such systems, the caches are kept in a state of coherence by ensuring that any shared data that is changed in any cache is changed throughout the entire system. Thus, cache coherence may be considered before a write operation under the condition that the requested data block is shared by a cache memory in another processor.

Many conventional methods have been implemented to maintain cache coherence. Such conventional methods may include a write-invalidate protocol, a snooping scheme, and a directory scheme. Although such conventional methods are generally thought to provide acceptable memory sharing functions, they are not without shortcomings. For example, rather complex logic may be necessary to implement the conventional methods. Such complex logic may increase power consumption and the time required for designing the processor core.

SUMMARY OF THE INVENTION

According to one exemplary embodiment of the present invention, a multiprocessor system may include a plurality of processors respectively having at least one cache memory. A memory unit may include at least one data block that is sharable by at least two of the processors. A directory memory may store information indicating the processors that share the at least on data block of the memory unit. And a control unit may be connected between the processors and the directory memory. The control unit may forward an interrupt signal to a first one of the processor when the information in the directory memory indicates that the first one of the processors shares the at least one data block, and when the control unit receives an access request for the at least one data block of the memory unit from a second one of the processors.

In an exemplary embodiment, the access request may be associated with a write request.

In an exemplary embodiment, a processor receiving an interrupt from the control unit may invalidate the requested data in the cache memory.

In an exemplary embodiment, each of the plurality of processors may include a write buffer connected to the cache memory.

In an exemplary embodiment, a processor receiving the interrupt from the control unit may forward an interrupt completion response to the control unit when the respective write buffer is empty.

In an exemplary embodiment, a processor receiving the interrupt from the control unit may write a data block stored in the respective write buffer to the memory unit and then forward an interrupt completion response to the control unit when the data block is stored in the respective write buffer.

In an exemplary embodiment, each of the respective cache memories may be a level 1 cache memory, and the memory unit may be a level 2 cache memory. The directory memory may further include information indicating the validity of each data block of the level 2 cache memory.

In an exemplary embodiment, data may be written from the cache memory in a write-through fashion.

According to another exemplary embodiment of the present invention, a method is provided to maintain cache coherence in a multiprocessor system with a plurality of processors respectively having at least one cache memory. The processors may share a memory unit. The method may include sending an access request for a data block of the memory unit from a second one of the processors. An interrupt signal may be forwarded to a first one of the processors when the data block is shared by the first one of the processors. And the data block stored in the cache memory of the first one of the processor may be invalidated.

In an exemplary embodiment, the access request may be associated with a write request. The method may further include forwarding a retry access request signal to the second one of the processors.

In an exemplary embodiment, a split transaction protocol may be implemented. The method may further include forwarding a wait response signal to the second one of the processors.

In an exemplary embodiment, each of the plurality of processors may include a write buffer connected to the cache memory. The method may further include responding to the access request from the second one of the processors after writing the data block stored in the write buffer of the first one of the processors to the memory unit when the data block is stored in the write buffer of the first one of the processors.

In an exemplary embodiment, the method may further include responding to the access request of the from the second one of the processors when the write buffer in the first one of the processors is empty.

In an exemplary embodiment, each of the respective cache memories may be a level 1 cache memory, and the memory unit may be a level 2 cache memory. The method may further include invalidating the data block of the level 2 cache memory which corresponds to the invalidated data block of the level 1 cache memory of the first one of the processors.

According to another exemplary embodiment, a method of operating a memory controller unit is provided. The method may include receiving an access request for a data block of a memory unit from a second processor. A directory memory may be investigated to determine if the data block is shared by a first processor. When the data block is shared by the first processor, an interrupt signal may be forwarded to the first processor, and a retry request signal may be forwarded to the second processor. The access request of the second processor may be granted upon receiving an interrupt completion response from the first processor.

In an exemplary embodiment, a memory controller unit may include a memory unit with a data block that is sharable by a plurality of processors. A directory memory may indicate the processors that share the data block. A control unit may be connected to memory unit and the directory memory. The control unit may forward an interrupt signal to a first one of the processors when an access request signal for the data block is received from a second processor, and when the directory memory indicates that a first processor shares the data block. The control unit may grant the access request of the second processor when an interrupt completion signal is received from the first processor.

According to another exemplary embodiment, a method of operating a processor having a cache memory and a write buffer is provided. The method may include receiving an interrupt signal from a control unit. A data block in the cache memory may be invalidated when the interrupt signal is associated with another processor requesting to write to the data block. The data block may be written to a memory unit when the data block is present in the write buffer. An interrupt completing response may be forwarded to the control unit.

In an exemplary embodiment, a processor may include a processor core including a write buffer and a cache memory in which a shared data block is inserted. The processor may also include a processing unit that may invalidate the shared data block in the cache memory upon receiving an interrupt signal that is associated with another processor requesting to write to the shared data block. The processing unit may write the shared data block to a memory unit when the shared data block is present in the write buffer. The processing unit may forward an interrupt completion response to a control unit.

According to another exemplary embodiment, a method of operating a processor is provided. The method may include forwarding an access request for a data block of a memory unit. A retry request signal may be received from a control unit when the data block is shared by another processor. The data block may be inserted into a cache memory of the processor upon receiving an authorization signal from the control unit.

In an exemplary embodiment, a processor may include a processor core including a cache memory. The processor may also include a processing unit that may forward an access request for a data block of a memory unit. The processing unit may receive a retry request signal from a control unit when the data block is shared by another processor. The processing unit may insert the data block into the cache memory of the processor upon receiving an authorization signal from the control unit.

It is to be understood that both the foregoing general description and the following detailed description of embodiments of the present invention are exemplary and non-limiting.

BRIEF DESCRIPTION OF THE DRAWINGS

Exemplary, non-limiting embodiments of the present invention will now be described more fully with reference to the accompanying drawings. This invention may be embodied in numerous and varied forms and should not be constructed as limited to the disclosed embodiments, which are exemplary and non-limiting. In the drawings.

DETAILED DESCRIPTION OF THE INVENTION

Exemplary, non-limiting embodiments of the present invention are illustrated in the accompanying drawings. It will be appreciated that the present invention is not limited to the illustrated embodiments. Rather, the illustrated embodiments are provided so that this disclosure will be thorough and complete, and will fully convey the scope and spirit of the present invention to those skilled in the art.

Figure 1:
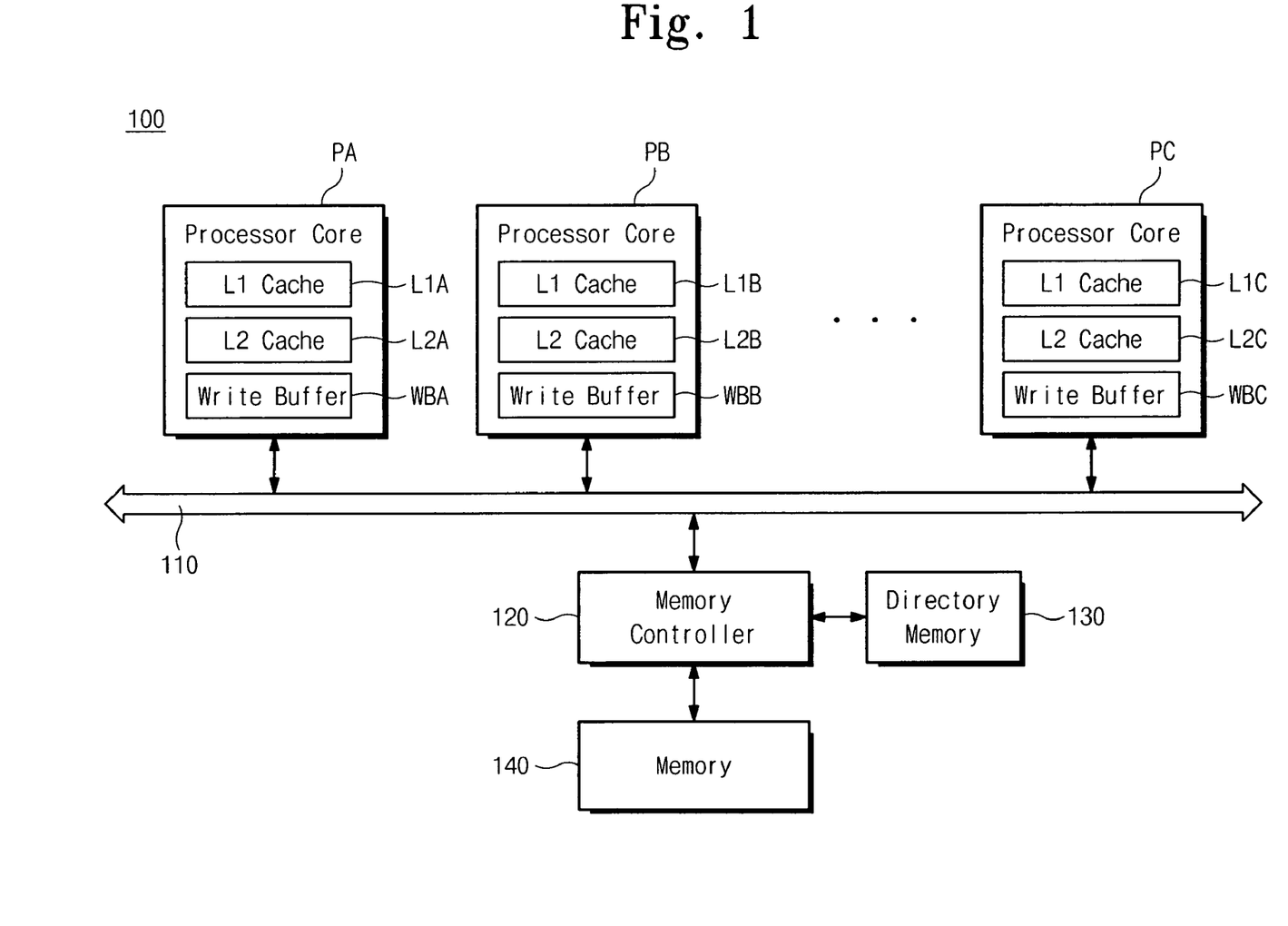
FIG. 1 is a schematic view of a multiprocessor system according to an exemplary embodiment of the present invention.

FIG. 1 shows a multiprocessor system in accordance with an exemplary, non-limiting embodiment of the present invention. The multiprocessor system 100 may include a plurality of processors PA, PB, PC, a bus 110, a memory controller 120, a directory memory 130, and a shared-memory 140.

The processors PA, PB, PC may be connected to the bus 110. Each processor may include a processor core that has a level 1 ("L1") cache memory, a level 2 ("L2") cache memory, and a write buffer ("WB"). For clarity, the constituent elements of the processors have been designated with labels that include the last letter of the label applied to the corresponding processor. For example, the processor PA includes the L1 cache "L1A," the L2 cache "L2A," and the write buffer "WBA." The processors PA, PB, PC may be implemented on the same integrated circuit chip. However, those skilled in the art will appreciate that the processors may be implemented on more than one integrated circuit chip.

The write buffer may temporarily store data that may be written from the L2 cache to the memory 140.

The memory 140 may be connected through the controller 120 to the bus 110. In this exemplary embodiment, the memory 140 may be shared by the processors PA, PB, PC. It will be appreciated, however, that less than all of the processors may share the memory 140. The memory controller 120 may manage the shared-memory 140 and handle processor transactions.

In the shared-memory 140 and the cache memories, data may be separated into and stored as data blocks (cache lines) of the same size. A data block of the shared-memory 140 may be accessed by initiating an access request and transferring a physical address. The processors may access the data blocks stored in the shared-memory 140 for read and/or write purposes. In addition, the cache may maintain data block status information that indicates the present state (e.g., valid or invalid) of each stored data block.

Figure 2:
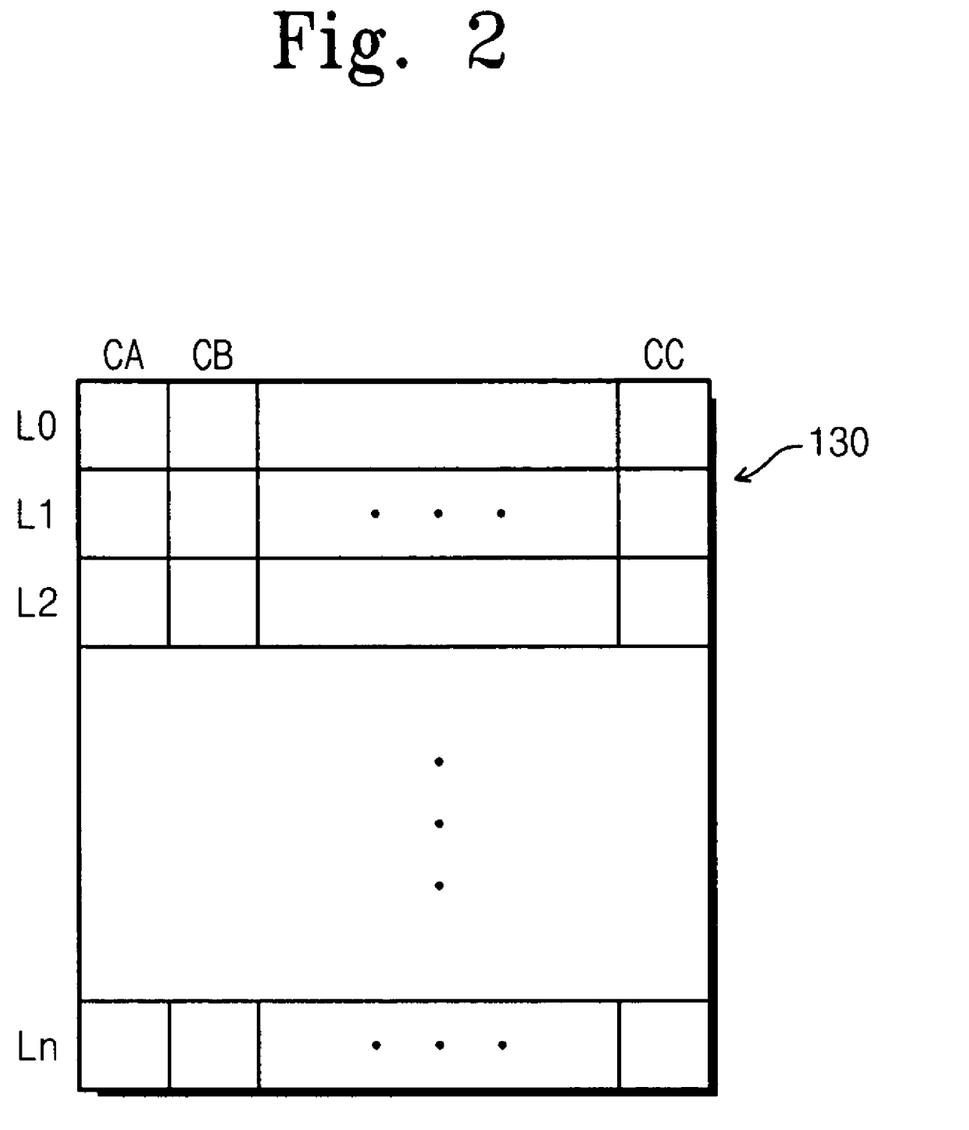
FIG. 2 is a schematic view of a directory memory of FIG. 1.

The directory memory 130 may store information indicating the processors that share data blocks of the memory 140. A shared data block refers to data stored in a block of the memory 140 for which access may be sought by more than one processor. FIG. 2 is a schematic view of the directory memory 130.

Referring to FIG. 2, the rows (L0-Ln) and the columns (CA-CC) of the directory memory 130 may correspond to blocks (BL0-BLn) of the memory 140 and the processors (PA-PC), respectively. For instance, information that indicates whether the processor PA shares the block BL0 of the memory 140 may be stored at a position where the row L0 intersects with the column CA. Thus, assuming that the number of processor sharing the memory 140 is C, one row of the directory memory 130 stores C bits. It will be appreciated that FIG. 2 depicts merely one exemplary embodiment of the directory memory 130, and that numerous, alternative directory memories may be suitably implemented. For example, one row of the directory memory 130 may store $\log_2 C$ bits, where C represents the number of processors sharing the memory 140.

Referring back to FIG. 1, when the memory controller 120 receives an access request with respect to the memory 140 from one of the processors PA, PB, PC, the memory controller 120 may access the directory memory 130 to obtain pertinent share information. The memory controller 120 may maintain cache coherence according to acquired information and then allow the requesting processor to access the memory 140.

Consider the following simplified scenario which illustrates one example in which cache coherence may not be maintained. Assume that the processor PA reads a data block DB0 from the memory 140. The read data block DB0 may be inserted into the cache memories L1A and L2A. The value of the data block DB0 may be VA. The processor PB may also read the data block DB0 from the memory 140 so that the data block DB0 may be copied to the cache memories L1B and L2B. At this time, the value of the data block DB0 is still VA. Now, further assume that the processor PA writes a new value V2 to the data block DB0. Here, the new value V2 would be stored at the cache memories L1A and L2A. However, the memory 140 and the cache memories L1B and L2B would still have the old VA value, so that coherence between the memory 140 and the cache memories would not be maintained. Therefore, the multiprocessor system according to a preferred embodiment of the present invention may be performed as follows.

In the following, illustrative scenario, assume that the data block DB0 of the memory 140 may be shared by the processor PA; i.e., the L1 cache L1A and the L2 cache L2A of the processor PA may store the data block DB0, respectively. Under this condition, if the processor PB forwards an access request for writing data to the data block DB0 of the memory 140, the memory controller 120 may investigate the directory memory 130. As a result, the memory controller 120 may detect that the access-requested data block DB0 by the processor PB is shared by the processor PA. The memory controller 120 may then forward a retry request signal to the processor PB. The retry request signal may instruct the processor PB to resend the access request at a later time. The memory controller 120 may also forward an interrupt signal to the processor PA.

The processor PA receiving the interrupt signal may investigate the type of interrupt signal. For example, the processor PA may identify from the received interrupt signal that the processor PB requested access for writing data to the data block DB0 (i.e., the write-requested data block DB0). In addition, the processor PA receiving the interrupt signal may invalidate the write requested data block DB0 in the L1 cache L1A and the L2 cache L2A, respectively. The processor PA may also determine whether the stored data block DB0 exists at the write buffer WBA. If so, the processor PA may write the data block to the memory 140. After this procedure is finished, the processor PA may forward an interrupt process completion response to the memory controller 120.

If the memory controller 120 receives the interrupt process completion response from the processor PA, the memory controller 120 may allow the requesting processor PB to access the memory 140. Accordingly, the write operation may be performed about the data block DB0 of the memory 140 depending on a processor's request. In such a method, the cache coherence can be maintained.

Under the same condition noted above (i.e., that the data block DB0 of the memory 140 is shared by the processor PA), now consider a situation in which the processor PB forwards an access request for reading data from the data block DB0 of the memory 140. Here, the constituent elements operate in a fashion that is similar to that of the write operation mentioned above. However, a point of difference is that the data block DB0 stored in the L1 cache L1A and the L2 cache L2A of the processor PA may not be invalidated because the data block DB0 is not influenced (or altered) by reading the data block DB0 of the memory 140. The operation of the multiprocessor system will be more fully described referring to FIGS. 3A and 3B.

Figure 3A:
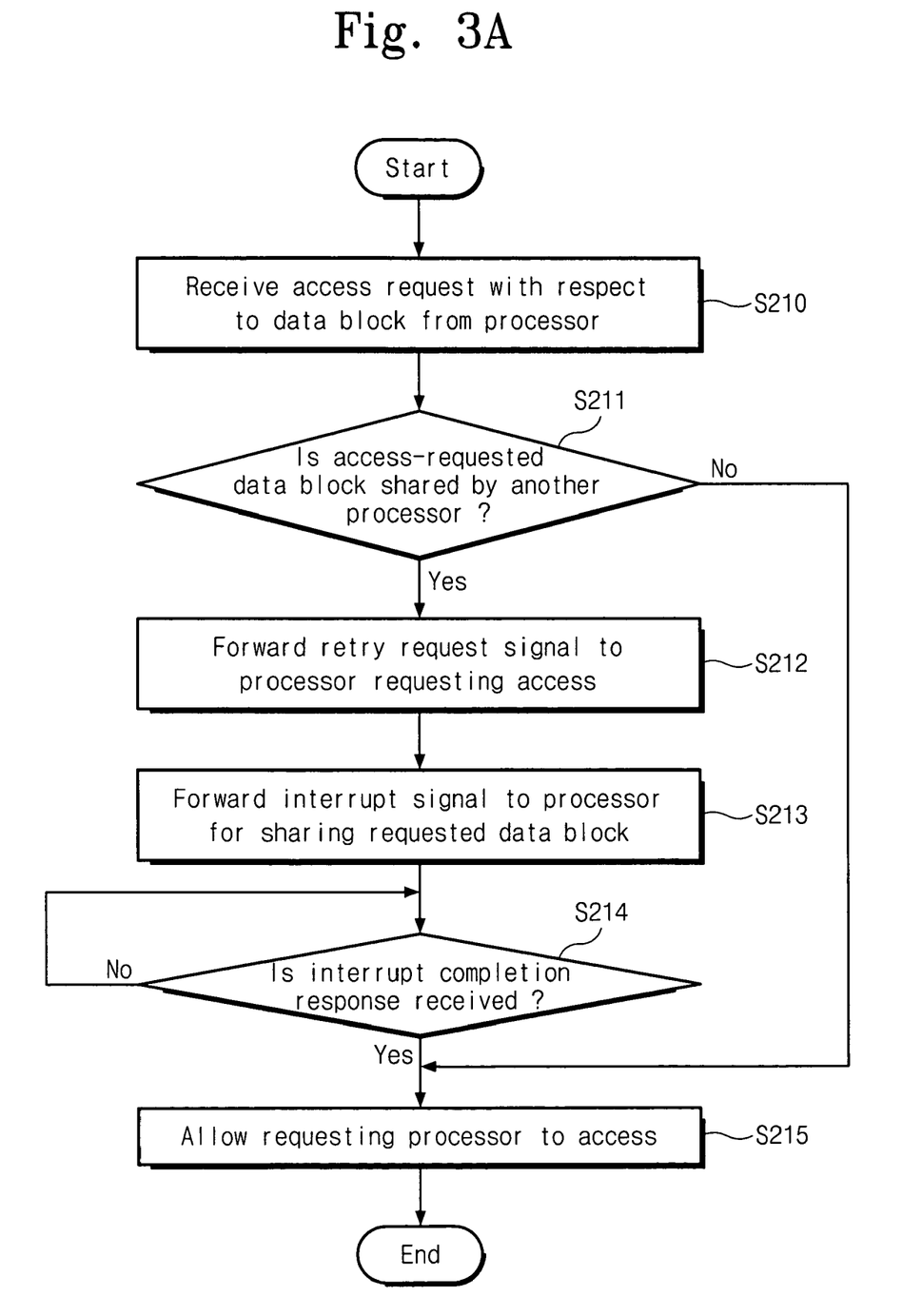
FIG. 3A is a flowchart of a control procedure that may be performed by a memory controller of FIG. 1.

FIG. 3A is a flowchart of a control procedure that may be performed by the memory controller 120 when the memory controller 120 receives an access request forwarded from a processor. In step S210, if any one of the processors PA, PB, PC requests access to the shared-memory 140 through the bus 110, then the memory controller 120 may receive the access request. In step S211, the memory controller 120 may decide whether the access-requested data block of the memory 140 is shared by another processor. If the access-requested data block of the memory 140 is shared by another processor (i.e., Yes at step S211), then the control proceeds to step S212.

In step S212, the memory controller 120 may forward a retry request signal to the requesting processor (i.e., the processor that forwarded the access request). If a split transaction protocol is implemented, then the memory controller 120 may forward a defer signal to the requesting processor. The defer signal may instruct the requesting processor to wait for a further response signal from the memory controller 120.

In step S213, the memory controller 120 may forward an interrupt signal to the processor sharing the access-requested data of the memory 140.

Figure 3B:
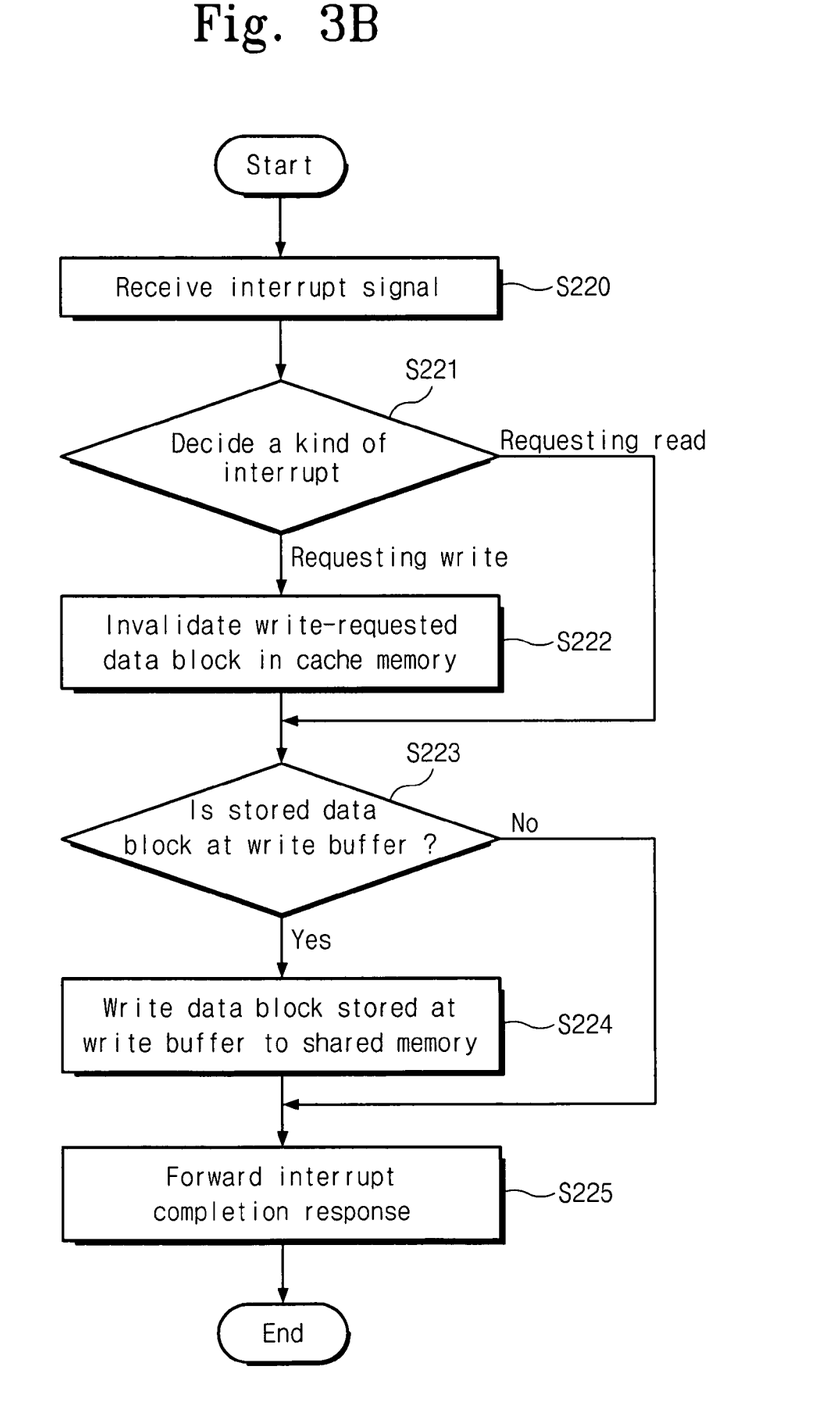
FIG. 3B is a flowchart of a control procedure that may be performed by a processor of FIG. 1.

FIG. 3B is a flow chart of a control procedure that may be performed by the processor receiving the interrupt signal (i.e., the considered processor). In step S220, the considered processor may receive the interrupt signal from the memory controller 120. In step S221, the considered processor may read the contents of the interrupt signal to determine an interrupt category. If the interrupt signal is associated with a write request from the requesting processor, then the control process may proceed to step S222. In step S222, the considered processor may invalidate the write requested data block stored in the L1 cache memory and the L2 cache memory. If the L1 and the L2 cache memories accept a write-through mode, then the entire system may operate in spite of invalidated data blocks stored in the L1 and the L2 cache memories. In step S221, if the interrupt signal is associated with a read request from the requesting processor, then the control process may skip step S222 and proceed to step S223.

The write buffer WB of the considered processor may include data, which is to be written from the L2 cache to the memory 120. If a processor (other than the considered processor that has received the interrupt signal) writes another data value to the same data block of the memory 120, under the condition that data stored in the write buffer of the considered processor are written in the memory 140, the system may be operated inadequately. To prevent this problem, in step S223, the considered processor decides whether the stored data block (i.e., the access-requested data block) exists in the write buffer. If the stored data block exists in the write buffer WB (Yes at step S223), then the control process may proceed to step S224. In step 224, the considered processor may write the data block stored in the write buffer to the memory 140. If the stored data block does not exist in the write buffer WB (No at step S223), then the control process may skip step S224 and proceed to step S225. In step S225, the considered processor may forward the interrupt completion response to the memory controller 120.

Turning back to FIG. 3A, in step S214, the memory controller 120 may decide whether the interrupt completion response is received from the considered processor, which received the interrupt signal. When the interrupt completion response is received, the control process may proceed to step S215. In step S215, the memory controller 120 may allow the requesting processor to access the memory 140.

Accordingly, the exemplary embodiment of the present invention may maintain cache coherence, while minimizing design modifications of processors that may not be fabricated with a multiprocessor environment in mind. Furthermore, the multiprocessor system in accordance with the exemplary embodiment of the present invention may reduce consumption of the system without complex logic for maintaining cache coherence.

In the multiprocessor system 100 discussed above, the processors PA, PB, PC may share the main memory 140. In another exemplary, non-limiting embodiment described below with reference to FIG. 4, each processor core may have the L1 cache and a write buffer WB, and the plurality of processor cores may share the L2 cache.

Figure 4:
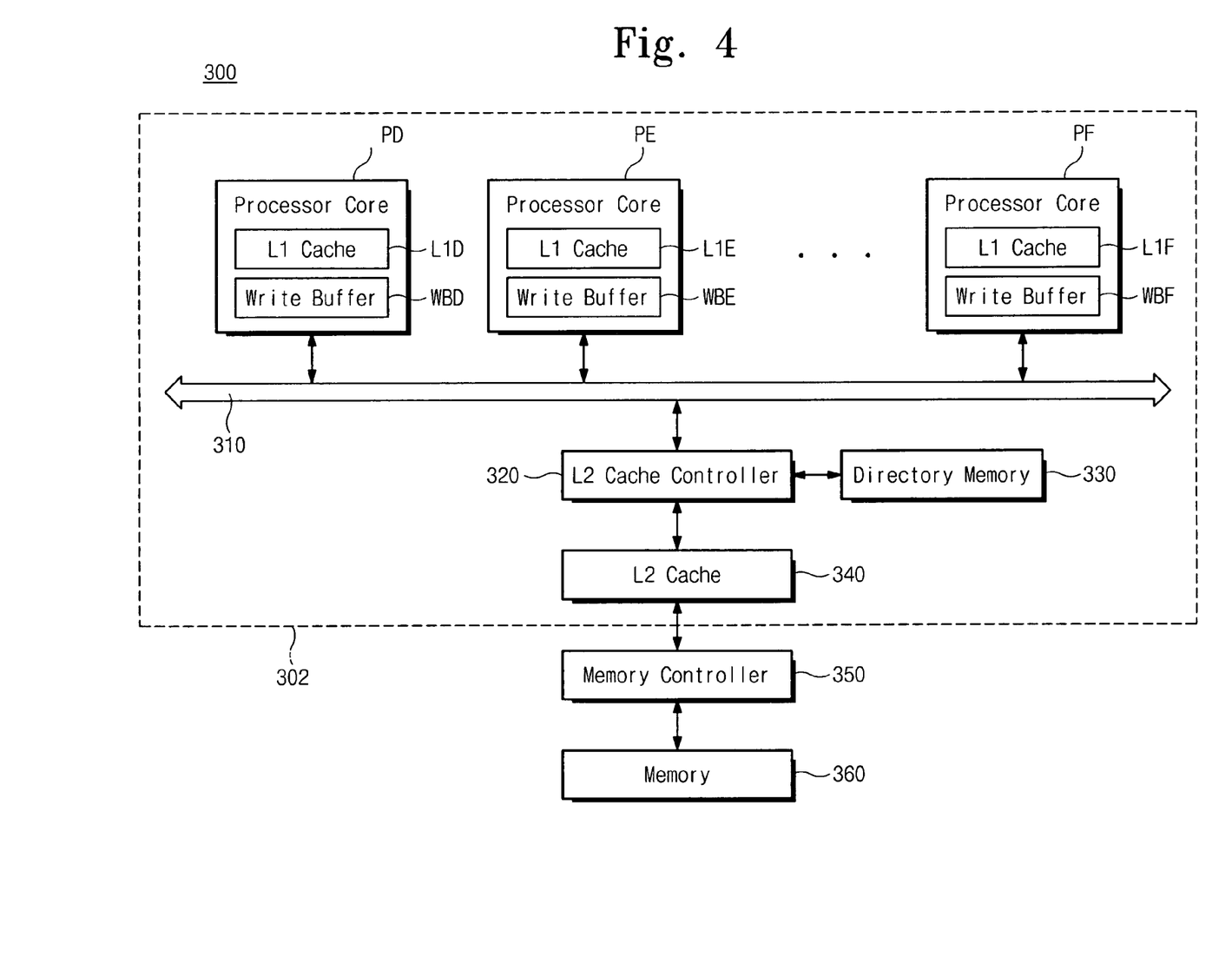
FIG. 4 is a schematic view of a multiprocessor system according to another exemplary embodiment of the present invention.

Referring to FIG. 4, the multiprocessor system 300 may include a multiprocessor 302 having a plurality of processors PD, PE, PF, a bus 310, an L2 cache controller 320, a directory memory 330, and an L2 cache 340. The multiprocessor 302 may be implemented on a single integrated circuit chip, or a plurality of integrated circuit chips. The multiprocessor system 300 may also include a memory controller 350 and a memory 360.

The processors PD, PE, PF may be connected to the bus 310. Each processor has a processor core that may include the level 1 ("L1") cache memory and the write buffer ("WB"). As in the previous embodiment, the constituent elements of the processors have been designated with labels that include the last letter of the label applied to the corresponding processor. For example, the processor PD includes the L1 cache "L1D" and the write buffer "WBD."

The write buffer may temporarily store data that may be written from the L1 cache to the L2 cache 340.

The L2 cache 340 may be connected through the L2 cache controller 320 to the bus 310. In this exemplary embodiment, the L2 cache 340 may be shared by the processors PD, PE, PF. It will be appreciated, however, that less than all of the processors may share the L2 cache 340. The L2 cache controller 320 may manage the L2 cache 340 and handle processor transactions. The memory 360 may be connected through the memory controller 350 to the L2 cache 340. The memory controller 350 may manage the memory 360. In the L1 cache, the L2 cache 340 and the memory 360, data may be separated into and stored as a data block (a cache line) of the same size.

Figure 5:
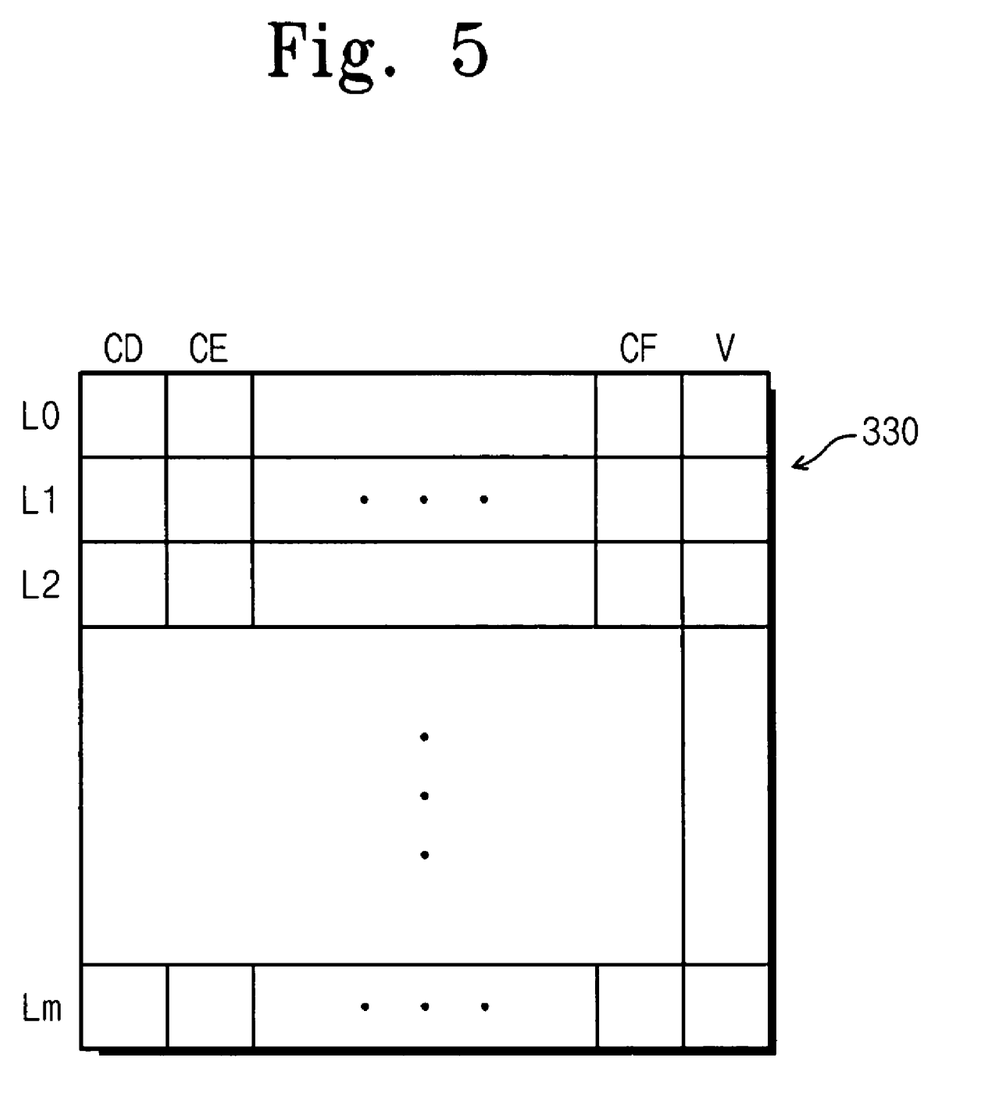
FIG. 5 is a schematic view of a directory memory of FIG. 4.

The directory memory 330 may store information indicating the processors that share data blocks of the L2 cache 340. A shared data block refers to data stored in a block of the L2 cache 340 for which access may be sought by more than one processor. FIG. 5 is a schematic view of the directory memory 330.

Referring to FIG. 5, the rows (L0-Lm) and the columns (CD-CF) of the directory memory 330 may correspond to blocks (BL0-BLm) of the L2 cache 340 and the processors (PD-PF), respectively. For instance, information that indicates whether the processor PD shares the block BL0 of the L2 cache memory 340 may be stored at a position where the row L0 intersects with the column CD. Thus, assuming that the number of processor sharing the L2 cache memory 340 is F, one row of the directory memory 330 may store F bits. In addition, each row of the directory memory 330 may further include a significant bit (V). The significant bit (V) may indicate whether the data that are stored in the corresponding block of the L2 cache memory 340 are valid or invalid. It will be appreciated that FIG. 5 depicts merely one exemplary embodiment of the directory memory 330, and that numerous, alternative directory memories may be suitably implemented. For example, one row of the directory memory 330 may store $\log_2 F$ bits, where F represents the number of processors sharing the L2 cache 340.

Referring back to FIG. 4, when the L2 cache controller 320 receives an access request with respect to the L2 cache 340 from one of the processors PD, PE, PF, the L2 cache controller 320 may access the directory memory 330 to obtain pertinent share information. The L2 cache controller 320 may maintain cache coherence according to acquired information and then allow the requesting processor to access the L2 cache 340. The operation of the multiprocessor system 300 will be more fully described referring to FIGS. 6A and 6B.

In the following illustrative scenario, assume that the data block DB0 of the L2 cache memory 340 may be shared by the processor PD; i.e., the L1 cache L1D may store the data block DB0. In such a system implementing a write-through method, the data block DB0 of the L1 and the L2 caches may be stored in the memory 360. Further assume that the processor PE forwards an access request to the data block DB0 of the L2 cache 340.

Figure 6A:
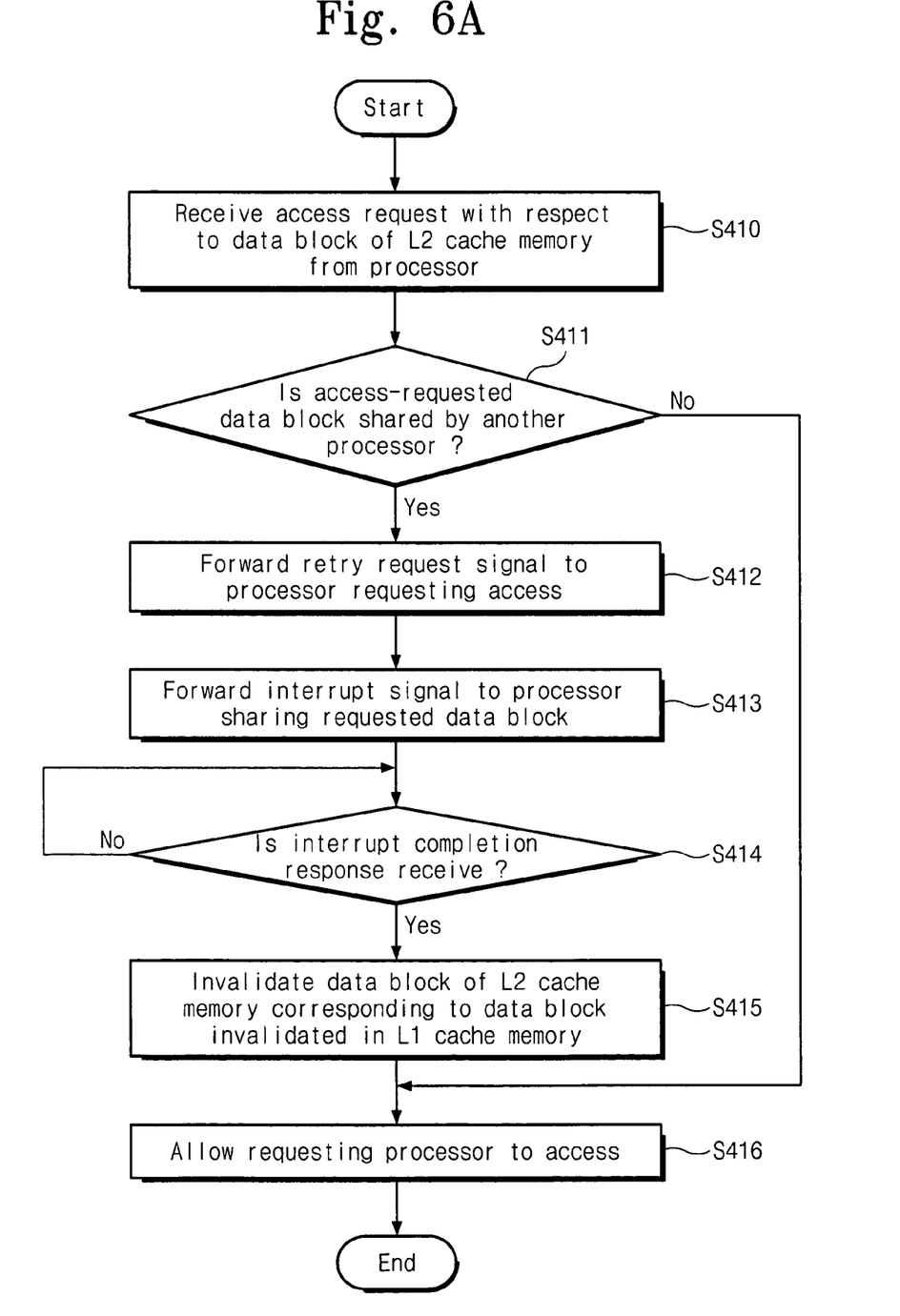
FIG. 6A is a flowchart of a control procedure that may be performed by a cache controller of FIG. 4.

FIG. 6A is a flowchart of a control procedure that may be performed by the L2 cache controller 320. In step S410, the L2 cache controller 320 receives the access request forwarded from the processor PE. In step S411, the L2 cache controller 320 may investigate the directory memory 330. As a result, the L2 cache controller 320 may detect that the data block DB0 requested by the processor PE is shared by the processor PD. In step S412, the L2 cache controller 320 may forward a retry request signal to the requesting processor PE. In step S413, the L2 cache controller 320 may also forward an interrupt signal to the processor PD.

Figure 6B:
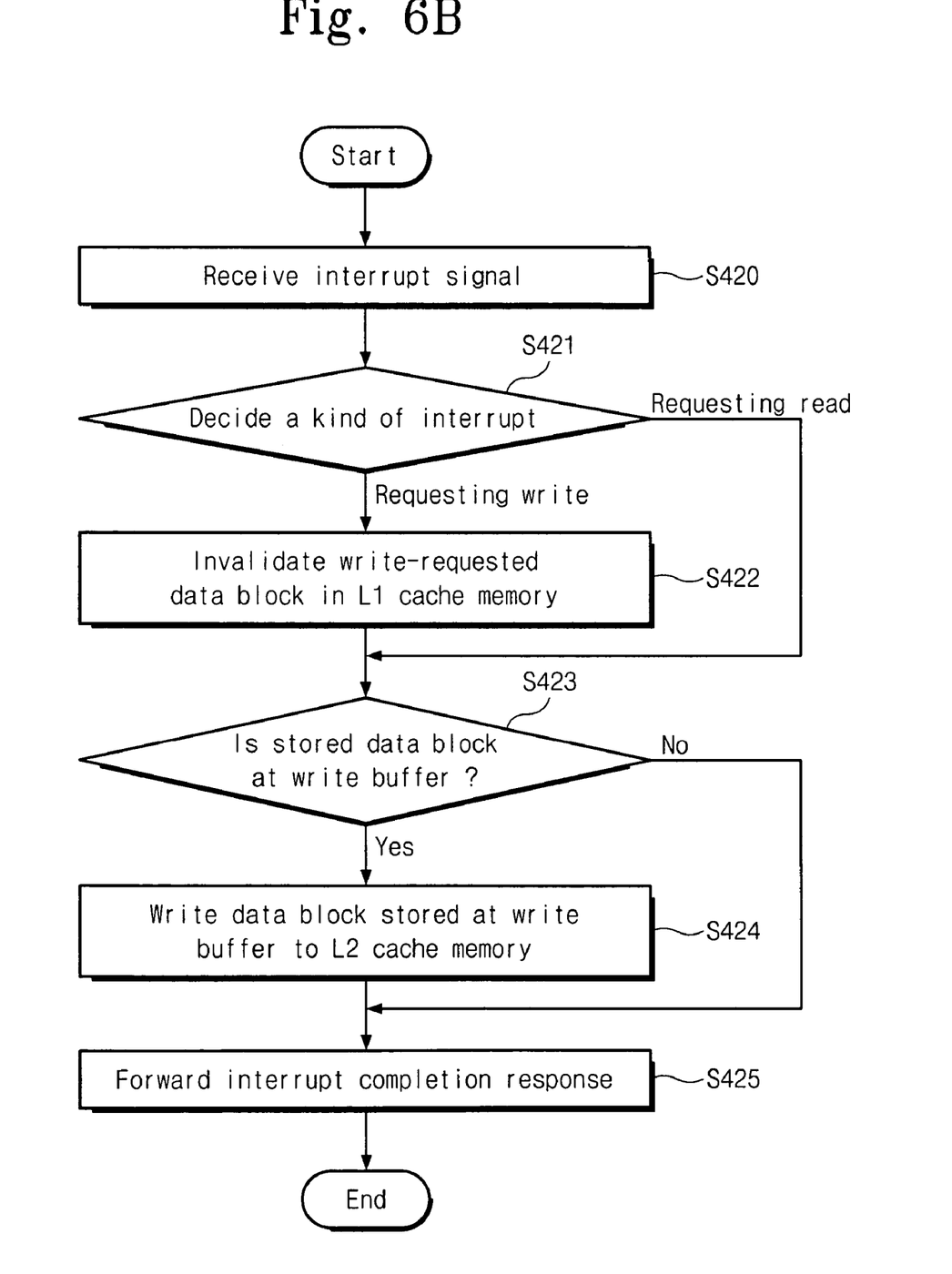
FIG. 6B is a flowchart of a control procedure that may be performed by a processor of FIG. 4.

FIG. 6B is a flow chart of a control procedure that may be performed by processor PD. Here, in step S420, the processor PD may receive the interrupt signal from the L2 cache controller 320. In step S421, the processor PD may determine an interrupt category. If the interrupt signal received from the L2 cache controller 320 is associated with a write request from the requesting processor PE, then the control process may proceed to step S422. In step S422, the processor PD may invalidate the write requested data block DB0 stored in the L1 cache L1D. In step S423, the processor PA may confirm whether the stored data block DB0 exists at the write buffer WBD. If so (yes at step S423), then the processor PA may write the data block to the L2 cache 340. In step S425, the processor PD may forward an interrupt completion response to the L2 cache controller 320.

Turning back to FIG. 6A, in step S414, the L2 cache controller may decide whether the interrupt completion response is received from the processor PD. If so, (yes at step S414), then at step S415, the L2 cache controller 320 may invalidate the data block of the L2 cache memory 340 corresponding to the data block that was invalidated in the L1 cache memory L1D. The data block of the L2 cache memory 340 may be invalidated by resetting the significant bit (V) of the corresponding row within the directory memory 330. In step S416, the L2 cache controller 320 may allow the requesting processor PE to access the L2 cache memory 340. According to this exemplary embodiment, a write operation may be performed about the data block DB0 of the L2 cache memory 340 depending on the access request from the requesting processor PE. In such a system, which may implement a write-through method, the data block DB0, which may be written by the processor PE in the L2 cache memory 340, may also written in the memory 360.

Under the condition that the data block DB0 of the L2 cache memory 340 is shared by the processor PD, now consider a scenario in which the processor PE forwards an access request for reading data from the data block DB0 of the L2 cache memory 340. Here, the constituent elements operate in a fashion that is similar to that of the write operation mentioned above. However, a point of difference is that the data block DB0 stored in the L1 cache L1D of the processor PD and the L2 cache 340 may not be invalidated because the data block DB0 is not influenced (or altered) by reading the data block DB0 of the L2 cache memory 340.

In the exemplary, non-limiting embodiments, the shared memory (i.e., the memory 140 in FIG. 1 or the L2 cache 340 in FIG. 4), the control unit (i.e., the memory controller 120 in FIG. 1 or the L2 cache controller 320 in FIG. 4), and the directory memory (i.e., the directory memory 130 in FIG. 1 or the directory memory 330 in FIG. 4) may be considered together as a memory controller unit. Further, each of the processors (i.e., PA, PB, PC in FIG. 1 or PC, PD, PE in FIG. 4) may include a processor unit that interacts with the processor core to carry out the procedures illustrated in FIGS. 3B and 6B. The processor unit may also perform the appropriate procedures when the processor requests access for a data block of the memory unit.

As previously mentioned, exemplary embodiments of the present invention may maintain cache coherence, while minimizing design modifications of processors that may not be fabricated with a multiprocessor environment in mind. Furthermore, the multiprocessor system in accordance with the exemplary embodiments of the present invention may reduce consumption of the system without complex logic for maintaining cache coherence.

It will be understood that the particular multiprocessor systems and methods have been shown by way of illustration only and not as a limitation of the invention. It will be apparent to those skilled in the art that the principles and features of the invention may be employed in varied and numerous embodiments without departing from the scope of the invention. Thus, it is intended that the present invention covers varied and numerous embodiments of this invention provided they come within the scope of the appended claims and their equivalents.

What is claimed is:

1. A multiprocessor system comprising:
a plurality of processors respectively having at least one cache memory;
a memory unit with at least one data block that is sharable by at least two of the processors;
a directory memory storing information indicating the processors that share the at least one data block; and
a control unit connected between the processors and the directory memory, the control unit forwarding an interrupt signal to a first one of the processors
when the information in the directory memory indicates that the first one of the processors shares the at least one data block, and
when the control unit receives an access request for the at least one data block of the memory unit from a second one of the processors, wherein the access request for the at least one data block of the memory unit is associated with a write request,
wherein the at least one data block is stored in the respective cache memory of the first one of the processors, and
wherein the first one of processors invalidates the at least one data block stored in the respective cache memory after receiving the interrupt signal.

2. The multiprocessor system of claim 1, wherein each of the plurality of processors includes a write buffer.

3. The multiprocessor system of claim 2, wherein, when the write buffer of the first one of the processors is empty, the first one of the processors forwards an interrupt completion response to the control unit.

4. The multiprocessor system of claim 2, wherein, when the at least one data block is present in the write buffer of the first one of the processors, the first one of the processors writes the at least one data block from the write buffer to the memory unit and then forwards an interrupt completion response to the control unit.

5. The multiprocessor system of claim 1, wherein each of the respective cache memories is a level 1 cache memory, and the memory unit is a level 2 cache memory.

6. The multiprocessor system of claim 5, wherein the directory memory further includes information indicating the validity of each data block of the level 2 cache memory.

7. The multiprocessor system of claim 1, wherein data written from the cache memory is performed in write-through fashion.

8. A method to maintain cache coherence in a multiprocessor system with a plurality of processors respectively having at least one cache memory and a write buffer, the processors sharing a memory unit, the method comprising:
sending an access request for a data block of the memory unit from a second one of the processors;
forwarding an interrupt signal from a control unit connected between the processors and the directory memory to a first one of the processors when the data block is shared by the first one of the processors;
responding to the access request from the second one of the processors when the write buffer of the first one of the processors is empty; and
invalidating the data block stored in the cache memory of the first one of the processors.

9. The method of claim 8, wherein the access request is associated with a write request.

10. The method of claim 8, further comprising forwarding a retry access request signal to the second one of the processors.

11. The method of claim 8, wherein a split transaction protocol is implemented.

12. The method of claim 11, further comprising forwarding a wait response signal to the second one of the processors.

13. The method of claim 8, further comprising, when the data block is present in the write buffer of the first one of the processors, writing the data block from the write buffer to the memory unit and then responding to the access request from the second one of the processors.

14. The method of claim 8, wherein each of the respective cache memories is a level 1 cache memory, and the memory unit is a level 2 cache memory.

15. The method of claim 14, further comprising invalidating the data block of the level 2 cache memory which corresponds to the invalidated data block of the level 1 cache memory of the first one of the processors.

16. A multiprocessor system comprising a plurality of processors respectively having at least one cache memory, a memory unit with at least one data block that is sharable by at least two of the processors, a directory memory storing information indicating the processors that share the at least one data block; and a control unit connected between the processors and the directory memory, the multiprocessor maintaining cache coherence in accordance with the method of claim 8.

* * * * *